(12) United States Patent
Ikeda et al.

(10) Patent No.: US 8,960,585 B2
(45) Date of Patent: Feb. 24, 2015

(54) SEATBELT RETRACTOR AND SEATBELT APPARATUS INCLUDING THE SAME

(75) Inventors: Kenji Ikeda, Tokyo (JP); Tomofumi Nakagawa, Tokyo (JP)

(73) Assignee: Takata Corporation, Tokyo (JP)

( * ) Notice: Subject to any disclaimer, the term of this patent is extended or adjusted under 35 U.S.C. 154(b) by 197 days.

(21) Appl. No.: 13/522,916

(22) PCT Filed: Dec. 10, 2010

(86) PCT No.: PCT/JP2010/007206
§ 371 (c)(1),
(2), (4) Date: Jul. 18, 2012

(87) PCT Pub. No.: WO2011/092787
PCT Pub. Date: Aug. 4, 2011

(65) Prior Publication Data
US 2012/0292417 A1 Nov. 22, 2012

(30) Foreign Application Priority Data
Jan. 29, 2010 (JP) .................................. 2010-017836

(51) Int. Cl.
*B65H 59/02* (2006.01)
*B60R 22/44* (2006.01)
(Continued)

(52) U.S. Cl.
CPC ................. *B60R 22/44* (2013.01); *B60R 22/46* (2013.01); *B60R 2022/4473* (2013.01); *B60R 2022/4666* (2013.01); *B60R 2022/4685* (2013.01); *B60R 2022/4825* (2013.01)
USPC .................................... 242/422.2; 242/390.8

(58) Field of Classification Search
CPC ................. B60R 2022/468; B60R 2022/4666
USPC ............. 242/390, 390.1, 398.8–398.9, 422.2, 242/390.8–390.9
See application file for complete search history.

(56) References Cited

U.S. PATENT DOCUMENTS 6,290,160 B1 * 9/2001 Strobel ......................... 242/383
6,702,326 B1 3/2004 Fujii
(Continued)

FOREIGN PATENT DOCUMENTS

DE 102006036554 A1 2/2008
DE 102006037735 A1 2/2008
(Continued)

OTHER PUBLICATIONS

International Search Report PCT/JP2010/007206 dated Feb. 1, 2011.
(Continued)

*Primary Examiner* — Sang Kim
(74) *Attorney, Agent, or Firm* — Foley & Lardner LLP (57) ABSTRACT

A transmitting gear is mounted on a rotating shaft of a spool so as to be rotatable integrally with the rotating shaft. A rotation sensor is disposed eccentrically with respect to the rotating shaft in a radial direction of the rotating shaft. The rotation sensor is disposed in a direction in which the rotating shaft is separated from the rotation sensor by a large load applied from a seatbelt to the spool in an emergency. The rotation sensor includes annularly arranged magnets and a magnet holding member that holds the magnets. The magnet holding member includes a receiving gear External teeth of the receiving gear engage with external teeth of the transmitting gear to increase a speed of rotation of the spool whose rotation is transmitted to the receiving gear.

6 Claims, 8 Drawing Sheets

(51) Int. Cl.
  *B60R 22/46* (2006.01)
  *B60R 22/48* (2006.01)

(56) References Cited

U.S. PATENT DOCUMENTS

| | | | |
|---|---|---|---|
| 7,080,801 B2 * | 7/2006 | Prokscha et al. | 242/390.9 |
| 8,141,808 B2 * | 3/2012 | Maemura et al. | 242/422.2 |
| 2008/0012285 A1 | 1/2008 | Holbein et al. | |
| 2008/0105777 A1 | 5/2008 | Holbein et al. | |
| 2010/0072313 A1 | 3/2010 | Maemura et al. | |

FOREIGN PATENT DOCUMENTS

| | | |
|---|---|---|
| JP | 2000-335368 | 12/2000 |
| JP | 2000-344050 | 12/2000 |
| JP | 2001-151076 | 6/2001 |
| JP | 2005-297781 | 10/2005 |
| JP | 2007-326513 | 12/2007 |
| JP | 2008-126978 | 6/2008 |
| JP | 2008-275636 | 11/2008 |
| JP | 2009-113718 | 5/2009 |
| WO | WO 2008/117820 A1 | 10/2008 |

OTHER PUBLICATIONS

Notice of Rejection dated Oct. 9, 2013 issued in connection with Japanese Patent Application No. 2010-017836.

European Search Report dated Jun. 3, 2013 in connection with European Application No. 10844555.2.

* cited by examiner

PRIOR ART

FIG. 6

PRIOR ART

FIG. 7

PRIOR ART

SEATBELT RETRACTOR AND SEATBELT APPARATUS INCLUDING THE SAME

TECHNICAL FIELD

The present invention relates to a technical field of a seatbelt retractor and a seatbelt apparatus including the same in which an electric motor serving as a drive means drives and controls rotation of a spool to retract and withdraw a seatbelt. In particular, the present invention relates to a technical field of a seatbelt retractor and a seatbelt apparatus including the same that include a rotation detecting member configured to detect the amount of rotation of a spool.

BACKGROUND ART

Conventionally, a seatbelt apparatus mounted on a vehicle, such as an automobile, restrains an occupant with a seatbelt to prevent the occupant from moving forward from the seat in an emergency, such as a vehicle collision. Such a seatbelt apparatus includes a seatbelt retractor that retracts a seatbelt. In the seatbelt retractor, the seatbelt is retracted onto a spool when it is not in use, and is withdrawn and worn by an occupant when it is in use. In the event of an emergency, such as that described above, a means for locking the seatbelt retractor is actuated to prevent the spool from rotating in the belt withdrawing direction, thereby preventing the seatbelt from being withdrawn. Thus, the seatbelt retains the occupant in an emergency.

In conventional seatbelt apparatuses, various belt tension modes are set depending on how the vehicle runs, how the seatbelt apparatus is used, etc. Various seatbelt apparatuses are known which include, as a seatbelt retractor, a motor retractor in which a spool for retracting a seatbelt is rotated by power of a motor. In this seatbelt retractor, to realize belt tension corresponding to a belt tension mode set depending on how the vehicle runs, how the seatbelt apparatus is used, etc., a controller drives and controls an electric motor, serving as a drive means, to control the belt retraction onto the spool and the belt withdrawal from the spool.

For the controller to control the belt retraction onto the spool and the belt withdrawal from the spool by controlling drive of the electric motor, it is necessary to detect the amount and direction of rotation of the spool. A seatbelt retractor has been proposed which includes a rotation sensor that detects the amount and direction of rotation of a spool. Specifically, the rotation sensor includes magnets, a rotating disk supported by a rotating shaft of the spool so as to be rotatable integrally with the spool, and Hall elements (Hall ICs) configured to detect rotation of the rotating disk by detecting the magnets. The seatbelt retractor controls an electric motor on the basis of the amount of rotation of the spool detected by the rotation sensor (see, e.g., Patent Literature (PTL) 1).

Figure 5:
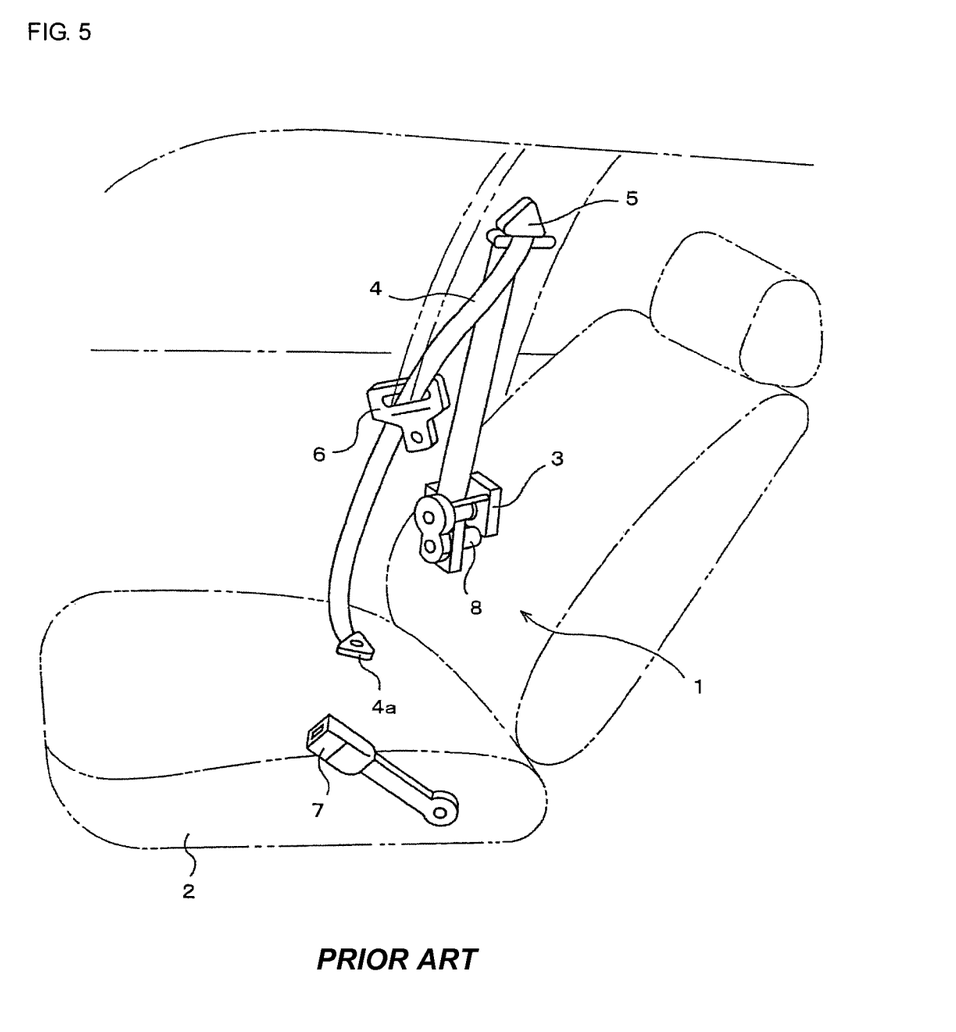
FIG. 5 illustrates a seatbelt apparatus described in PTL 1.
Figure 6:
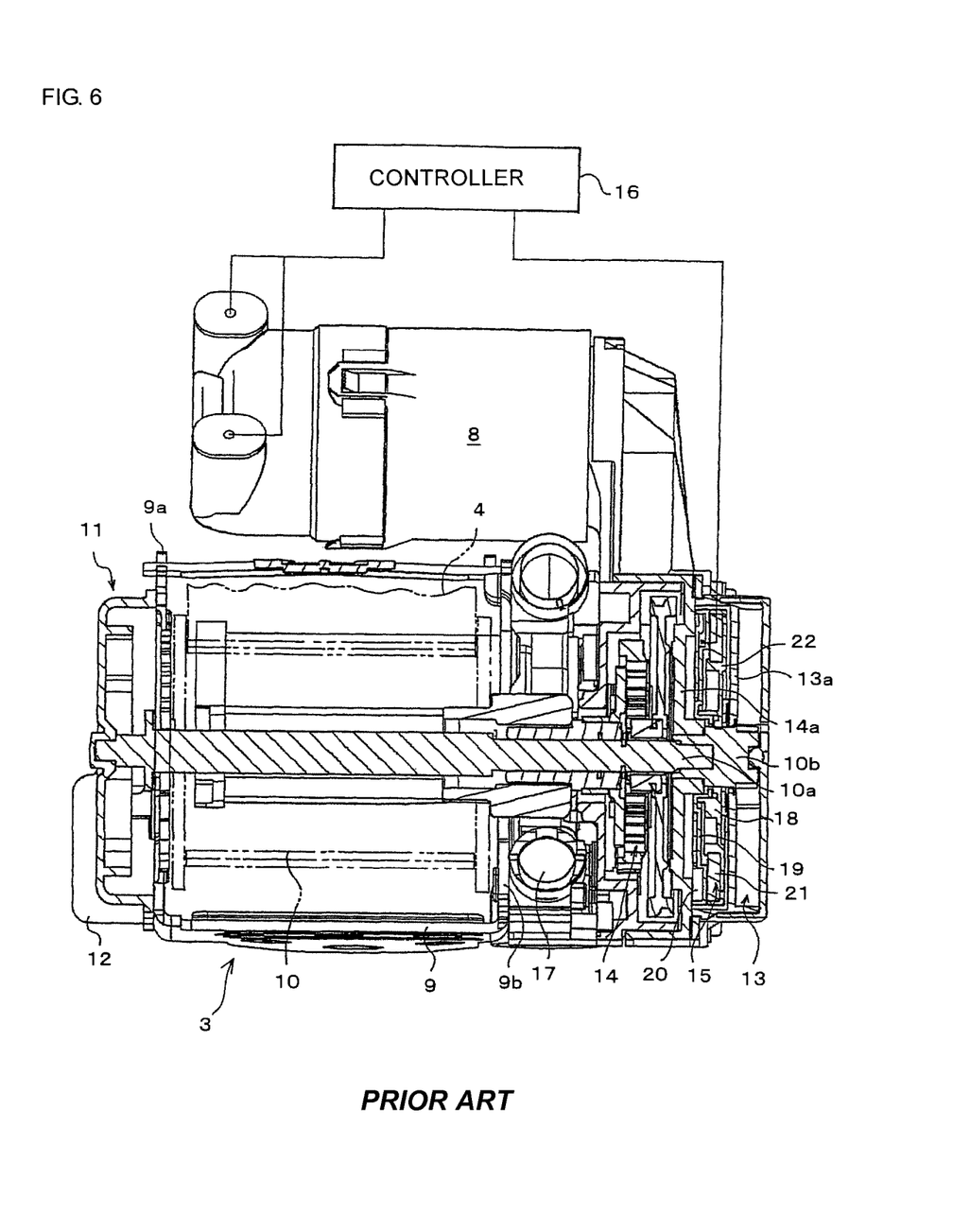
FIG. 6 illustrates a partial cross section of a seatbelt retractor described in PTL 1.
Figure 7:
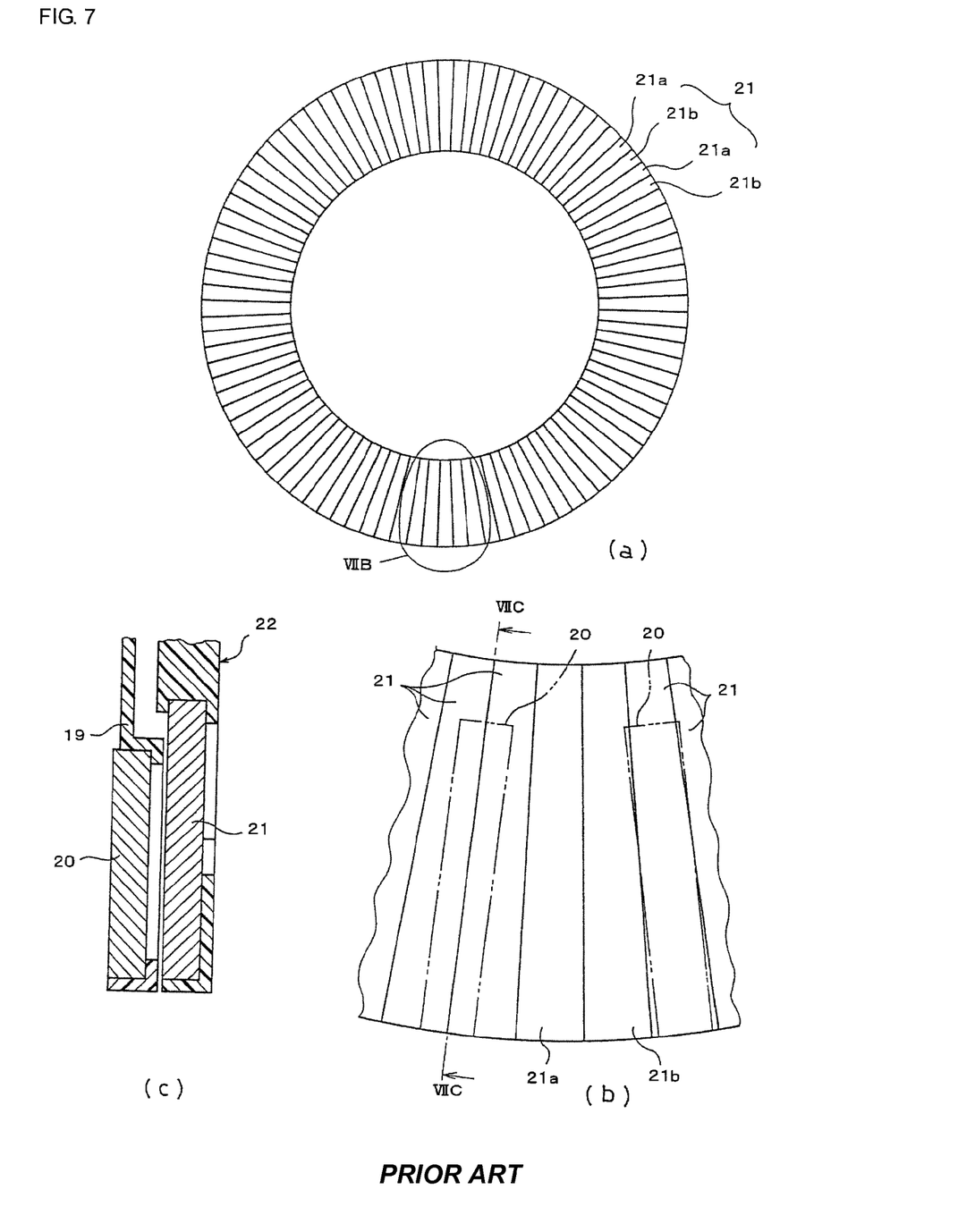
FIG. 7(a) illustrates annularly arranged magnets of a rotation sensor described in PTL 1.
FIG. 7(b) is a partial view corresponding to part VIIB of FIG. 7(a) and partially illustrating the rotation sensor described in PTL 1.
FIG. 7(c) is a cross-sectional view taken along line VIIC-VIIC of FIG. 7(b).
Figure 8:
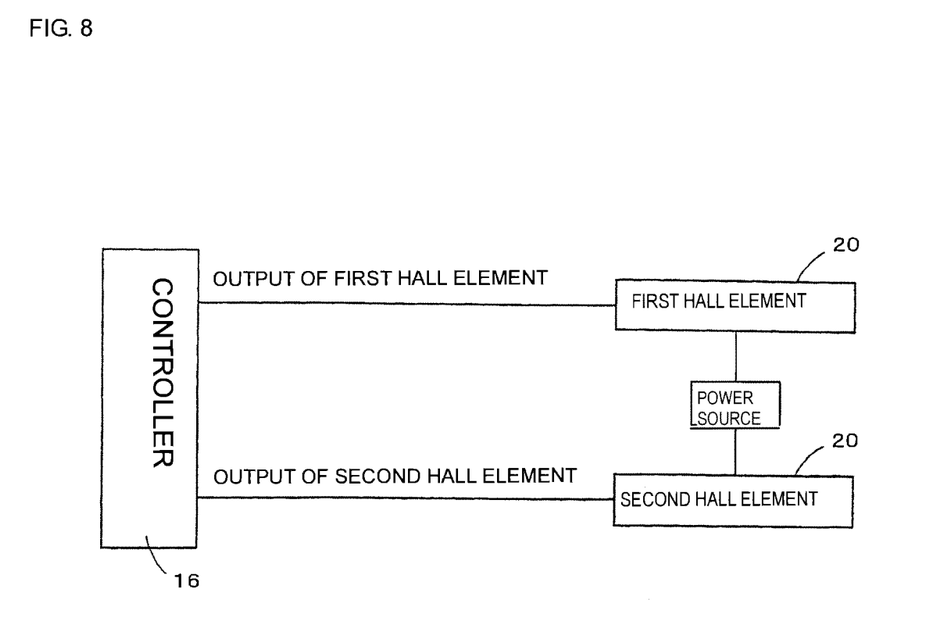
FIG. 8 illustrates how the rotation sensor detects rotation.

FIG. 5 illustrates a seatbelt apparatus described in PTL 1. FIG. 6 illustrates a partial cross section of a seatbelt retractor described in PTL 1. FIG. 7(a) illustrates annularly arranged magnets of a rotation sensor described in PTL 1. FIG. 7(b) is a partial view corresponding to part VIM of FIG. 7(a). FIG. 7(c) is a cross-sectional view taken along line VIIC-VIIC of FIG. 7(b). FIG. 8 illustrates how the rotation sensor detects rotation.

In FIG. 5 to FIG. 8, reference numeral 1 denotes a seatbelt apparatus; reference numeral 2 denotes a vehicle seat; reference numeral 3 denotes a seatbelt retractor configured as a motor retractor; reference numeral 4 denotes a seatbelt withdrawably retracted by the seatbelt retractor 3, the seatbelt having a belt anchor 4a at an end thereof to be secured to a vehicle floor or the vehicle seat 2; reference numeral 5 denotes a guide anchor configured to guide the seatbelt 4 withdrawn from the seatbelt retractor 3 to a shoulder of an occupant; reference numeral 6 denotes a tongue slidably supported by the seatbelt 4 guided by the guide anchor 5; reference numeral 7 denotes a buckle secured to the vehicle floor or the vehicle seat and into which the tongue 6 is engageably and disengageably inserted and engaged; reference numeral 8 denotes an electric motor serving as a drive means that rotates a spool 10 of the seatbelt retractor 3 to retract and withdraw the seatbelt 4; reference numeral 9 denotes a U-shaped frame; reference numeral 9a denotes a left side wall of the frame 9; reference numeral 9b denotes a right side wall of the frame 9; reference numeral 10 denotes a spool configured to retract the seatbelt 4; reference numeral 10a denotes a rotating shaft of the spool 10; reference numeral 11 denotes a lock mechanism 11; reference numeral 12 denotes a deceleration sensing mechanism; reference numeral 13 denotes a spring mechanism serving as a spool retraction biasing mechanism; reference numeral 13a denotes a case of the spring mechanism 13; reference numeral 14 denotes a power transmission mechanism, such as a planetary-gear deceleration mechanism or an external-gear deceleration mechanism; reference numeral 14a denotes a case of the power transmission mechanism 14; reference numeral 15 denotes a rotation sensor serving as a rotation detecting member; reference numeral 16 denotes a controller (CPU); reference numeral 17 denotes a pretensioner; reference numeral 18 denotes a rotating disk of the rotation sensor 15, the rotating disk being mounted through a bushing 10b on the rotating shaft 10a of the spool 10 so as to be concentric with and rotatable integrally with the rotating shaft 10a; reference numeral 19 denotes a bracket secured to the right side wall 9b of the frame 9; reference numeral 20 denotes a pair of Hall elements (Hall ICs) of the rotation sensor 15, the Hall elements being spaced with a predetermined distance therebetween along the circumference of a circle concentric with the rotating shaft 10a, attached to the bracket 19, and electrically connected to the controller 16; reference numeral 21 denotes annularly arranged magnets of the rotating disk 18, the magnets being arranged concentrically with the rotating shaft 10a and including N-pole magnets 21a and S-pole magnets 21b alternately arranged; and reference numeral 22 denotes an annular magnet holding member of the rotating disk 18, the magnet holding member being configured to hold the magnets 21 and mounted on the rotating shaft 10a of the spool 10 so as to be rotatable integrally with the spool 10 and concentric with the rotating shaft 10a.

When the spool 10 rotates in the seatbelt withdrawing direction, the rotating disk 18 and the magnets 21 also rotate in the seatbelt withdrawing direction. This allows the pair of Hall elements 20 to detect the N-pole magnets 21a and the S-pole magnets 21b and output the resulting detection signals to the controller 16. When the Hall elements 20 detect the N-pole magnets 21a and the S-pole magnets 21b alternately, the current polarities of the detection signals from the Hall elements 20 switch from one to the other. The detection signals from the Hall elements 20 are out of phase by a predetermined amount. The controller 16 counts the number of times the current polarities of the detection signals from the Hall elements 20 have switched, and thereby detects the amount of rotation of the spool 10. On the basis of the amount by which the detection signals from the Hall elements 20 are out of phase, the controller 16 determines whether the spool 10 is rotating in the seatbelt withdrawing or retracting direction. Then, on the basis of the amount and direction of rotation of the spool 10, the controller 16 controls drive of the electric motor 8 to control the belt tension of the seatbelt 4.

CITATION LIST

Patent Literature

PTL 1: Japanese Unexamined Patent Application Publication No. 2009-113718

SUMMARY OF INVENTION

Technical Problem

In the seatbelt retractor 3 described in PTL 1, the bracket 19 to which the pair of Hall elements 20 of the rotation sensor 15 is attached is secured to the right side wall 9b of the frame 9. The bushing 10b mounted on the rotating shaft 10a of the spool 10 passes through the bracket 19 so as to be rotatable relative to the bracket 19. The spool 10 has some play with respect to the frame 9. Therefore, when the spool 10 rattles, the bracket 19 functions as a bearing that supports the rotating shaft 10a and the bushing 10b. To improve detection accuracy of the rotation sensor, it is necessary that a bearing portion of the bracket 19 be one with as little backlash as possible.

However, if an extremely large deceleration is applied to the vehicle in a vehicle collision or the like and the seatbelt 4 is pulled by an inertial force of the occupant, a large load is applied from the seatbelt 4 to the spool 10. In this case, if the bracket 19 functions as a bearing for the spool 10 as described above, the large load applied to the spool 10 is further applied through the rotating shaft 10a and the bushing 10b to the bracket 19 of the rotation sensor 15. If the thickness of the bracket 19 is increased to enhance the strength of the bracket 19, the size of each of the seatbelt retractor 3 and the rotation sensor 15 increases in the thrust direction (or in the axial direction of the spool 10). In particular, in the rotation sensor 15 described in PTL 1, where the bracket 19 and the rotating disk 18 are disposed in the axial direction of the spool 10, the size of the seatbelt retractor 3 increases in the thrust direction.

The present invention has been made in view of the circumstances described above. An object of the present invention is to provide a seatbelt retractor and a seatbelt apparatus including the same that can improve detection accuracy of a rotation detecting member, reduce a load applied to the rotation detecting member, and suppress an increase in size in the thrust direction.

Solution to Problem

To solve the problems described above, a seatbelt retractor according to the present invention includes at least a spool configured to retract a seatbelt, drive means for rotating the spool, and a rotation detecting member configured to detect the amount of rotation of the spool. The amount of rotation of the spool is controlled by driving and controlling the drive means on the basis of the amount of rotation of the spool detected by the rotation detecting member. In the seatbelt retractor, the rotation detecting member is disposed eccentrically with respect to a rotating shaft of the spool in a radial direction of the rotating shaft.

In the seatbelt retractor according to the present invention, the rotation detecting member is disposed in a direction in which the rotating shaft is separated from the rotation detecting member by a load applied from the seatbelt to the spool in an emergency.

Also in the seatbelt retractor according to the present invention, the rotation detecting member includes a rotating disk that includes a predetermined number of magnets and a receiving member rotatable integrally with the predetermined number of magnets. The predetermined number of magnets include N-pole magnets and S-pole magnets alternately and annularly arranged concentrically with the rotating disk. The seatbelt retractor further includes a transmitting member configured to transmit rotation of the spool to the receiving member, the transmitting member being mounted on the spool so as to be rotatable integrally with the spool; and a magnet detecting member configured to detect a magnet located at a predetermined position, the magnet being any of the predetermined number of magnets.

The seatbelt retractor according to the present invention further includes a speed increasing mechanism configured to increase a rotation speed of the transmitting member to transmit the rotation speed to the receiving member, and increase a rotation speed of the spool to rotate the magnets.

Also in the seatbelt retractor according to the present invention, the receiving member is a receiving gear and the transmitting member is a transmitting gear that engages with the receiving gear, and the speed increasing mechanism is composed of the receiving gear and the transmitting gear.

Also in the seatbelt retractor according to the present invention, the receiving member is a receiving pulley and the transmitting member is a transmitting pulley; and the speed increasing mechanism is composed of the receiving pulley, the transmitting pulley, and an endless belt wound around the receiving pulley and the transmitting pulley.

A seatbelt apparatus according to the present invention includes at least a seatbelt retractor configured to retract a seatbelt, a tongue slidably supported by the seatbelt withdrawn from the seatbelt retractor, and a buckle with which the tongue is engageably and disengageably engaged. The seatbelt apparatus is configured to restrain an occupant with the seatbelt. In the seatbelt apparatus, the seatbelt retractor is any one of the seatbelt retractors according to the present invention described above.

Advantageous Effects of Invention

In the seatbelt retractor according to the present invention configured as described above, the rotation detecting member is disposed eccentrically with respect to the rotating shaft of the spool in a radial direction of the rotating shaft. Therefore, unlike the conventional example, the rotation detecting member does not function as a bearing for the spool. Thus, even if a large load is applied from the seatbelt to the spool in an emergency, it is possible to effectively suppress transmission of the large load to the rotation detecting member. As a result, the size of the rotation detecting member in the thrust direction (or in the axial direction of the spool) can be made smaller than that in the conventional example.

In particular, since the rotation detecting member is disposed in a direction in which the rotating shaft is separated from the rotation detecting member by a large load applied to the spool in an emergency, it is possible to more effectively suppress transmission of the large load to the rotation detecting member in an emergency. As a result, the size of the rotation detecting member in the thrust direction can be made smaller than that in the conventional example. Thus, even if the rotation detecting member is provided, it is possible to effectively suppress an increase in size of the seatbelt retractor in the thrust direction. In particular, since the rotation detecting member is disposed eccentrically with respect to the rotating shaft of the spool in a radial direction of the rotating shaft, it is possible to more effectively suppress an increase in size of the seatbelt retractor in the thrust direction.

Moreover, since the transmission of the large load to the rotation detecting member can be suppressed, it is possible to suppress influence of the large load on the rotation detecting member. It is thus possible to improve detection accuracy of the rotation detecting member.

Additionally, if a large deceleration is exerted on the vehicle in an emergency, since an inertial force of the occupant applied to the seatbelt is directed substantially forward, the direction of the load is substantially constant. Therefore, it is possible to easily set the installation position of the rotation detecting member.

It is thus possible to realize a seatbelt retractor that can improve detection accuracy of the rotation detecting member, reduce a load applied to the rotation detecting member, and suppress an increase in size in the thrust direction.

The speed increasing mechanism that increases the speed of rotation of the spool at a predetermined speed-doubling rate to rotate the magnets is disposed between the rotation detecting member and the rotating shaft of the spool. Thus, since the rotation speed of the magnets is larger than that of the spool, the circumferential length of each of the N-pole magnets and S-pole magnets can be set to be long. In other words, a reference angle to be detected by the rotation detecting member can be made larger than a reference angle to be detected by the conventional rotation sensor. It is thus possible to effectively reduce variation in detection of the rotation detecting member. Therefore, it is possible to more effectively improve detection accuracy of the rotation detecting member.

In the seatbelt apparatus according to the present invention, which includes the seatbelt retractor of the present invention, it is possible to efficiently restrain an occupant with the seatbelt for a long period of time depending on how the vehicle runs, how the seatbelt apparatus is used, etc.

BRIEF DESCRIPTION OF DRAWINGS

[FIG. 1]

[FIG. 2]

[FIG. 3]

[FIG. 4]

[FIG. 5]

[FIG. 6]

[FIG. 7]

[FIG. 8]

DESCRIPTION OF EMBODIMENTS

Hereinafter, embodiments of the present invention will be described with reference to the drawings.

FIG. 1(a) is a perspective view partially illustrating a first embodiment of a seatbelt retractor according to the present invention, and FIG. 1(b) is a right side view of FIG. 1(a). In a seatbelt retractor and a seatbelt apparatus according to each of the following embodiments, components identical to those in previous embodiments and those of the seatbelt retractor and the seatbelt apparatus described in PTL 1 (illustrated in FIG. 5 to FIG. 8) are given the same reference numerals and their detailed description will be omitted.

As illustrated in FIG. 1(a) and FIG. 1(b), a seatbelt retractor 3 of the first embodiment includes a rotation sensor 15 serving as a rotation detecting member. The rotation sensor 15 is disposed eccentrically with respect to a rotating shaft 10a of a spool 10. The rotation sensor 15 includes a rotating disk 18 rotatably attached to a right side wall 9b of a frame, and a bracket 19 immovably attached to the right side wall 9b of the frame.

The rotating disk 18 includes an annular magnet holding member 22 and annularly arranged magnets 21 rotatable integrally with the magnet holding member 22. The annularly arranged magnets 21 include N-pole magnets 21a and S-pole magnets 21b arranged alternately. The magnet holding member 22 is integral with a tubular transmitting gear 23 (corresponding to a receiving member) having external teeth 23a arranged concentrically with the magnet holding member 22.

A transmitting gear 24 (corresponding to a transmitting member) is mounted through a bushing 10b on the rotating shaft 10a of the spool 10 so as to be concentric with and rotatable integrally with the rotating shaft 10a. The transmitting gear 24 has external teeth 24a, which engage with the external teeth 23a of the receiving gear 23.

While not shown in FIG. 1(a) and FIG. 1(b), as in the rotation sensor 15 described in PTL 1, a pair of Hall elements (Hall ICs) 20 serving as a magnet detecting member is attached to the bracket 19 so as to face some of the magnets 21. The Hall elements 20 detect magnets 21 located at respective predetermined positions.

Figure 2:
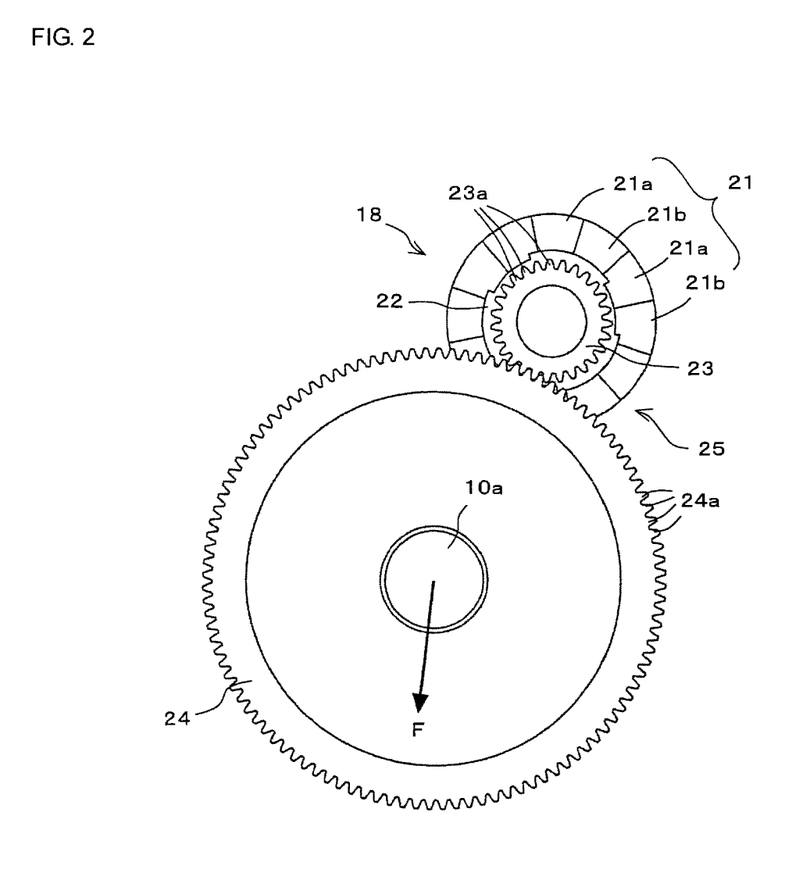
FIG. 2 illustrates a relationship between the direction of a load applied to a spool and the installation position of a rotation sensor.

In the seatbelt retractor 3 of the first embodiment, the rotation sensor 15 is disposed in a radial direction of the transmitting gear 24 (or in a radial direction of the rotating shaft 10a). As illustrated in FIG. 2, the external teeth 23a of the receiving gear 23 engage with the external teeth 24a of the transmitting gear 24 at a position in a direction in which the transmitting gear 24 (or the rotating shaft 10a) is moved away (or separated) from the receiving gear 23 (or the rotation sensor 15) by a large load F applied from the seatbelt 4 to the spool 10 in an emergency.

In the seatbelt retractor 3 of the first embodiment, a gear ratio between the external teeth 23a of the receiving gear 23 of the rotation sensor 15 and the external teeth 24a of the transmitting gear 24 is set such that the speed of rotation of the receiving gear 23 (or rotation of the magnets 21) is faster than that of rotation of the transmitting gear 24 (or rotation of the spool 10). That is, the receiving gear 23 and the transmitting gear 24 constitute a speed increasing mechanism 25 which is a gear mechanism that increases the speed of rotation of the spool 10 at a predetermined speed-doubling rate to rotate the magnets 21. Therefore, the speed increasing mechanism 25 is disposed between the rotation sensor 15 and the rotating shaft 10a of the spool 10.

The other configurations of the seatbelt retractor 3 and the configuration of a seatbelt apparatus 1 according to the first embodiment are the same as those of the seatbelt retractor 3 and the seatbelt apparatus 1 described in PTL 1.

In the seatbelt retractor 3 of the first embodiment configured as described above, the rotation sensor 15 is disposed eccentrically with respect to the rotating shaft 10a of the spool 10 in a radial direction of the rotating shaft 10a, and at a position in a direction in which the transmitting gear 24 is separated from the receiving gear 23 by a large load F applied to the spool 10 in an emergency. Therefore, even if a large load F is applied from the seatbelt 4 to the spool 10 in an emergency, very little load F is transmitted to the rotation sensor 15.

In the seatbelt retractor 3 of the first embodiment configured as described above, the rotation sensor 15 is disposed eccentrically with respect to the rotating shaft 10a of the spool 10 in a radial direction of the rotating shaft 10a, and at a position in a direction in which the transmitting gear 24 is separated from the receiving gear 23 by a large load F applied to the spool 10 in an emergency. Therefore, unlike the conventional example, the rotation sensor 15 does not function as a bearing for the spool 10. Thus, even if a large load F is applied from the seatbelt 4 to the spool 10 in an emergency, it is possible to effectively suppress transmission of the large load F to the rotation sensor 15. As a result, the size of the rotation sensor 15 in the thrust direction (or in the axial direction of the spool 10) can be made smaller than that in the conventional example. In the seatbelt retractor 3 of the first embodiment, which includes this rotation sensor 15, it is possible to effectively suppress an increase in size of the seatbelt retractor 3 in the thrust direction even if there is the rotation sensor 15. In particular, since the rotation sensor 15 is disposed eccentrically with respect to the rotating shaft 10a of the spool 10 in a radial direction of the rotating shaft 10a, it is possible to more effectively suppress an increase in size of the seatbelt retractor 3 in the thrust direction.

Moreover, since the transmission of the large load F to the rotation sensor 15 can be suppressed, it is possible to suppress influence of the load F on the rotation sensor 15. It is thus possible to improve detection accuracy of the rotation sensor 15.

Additionally, if a large deceleration is exerted on the vehicle in an emergency, since an inertial force of the occupant applied to the seatbelt 4 is directed substantially forward, the direction of the load F is substantially constant. Therefore, it is possible to easily set the installation position of the rotation sensor 15.

It is thus possible to realize a seatbelt retractor that can improve detection accuracy of the rotation sensor 15, reduce a load applied to the rotation sensor 15, and suppress an increase in size in the thrust direction.

The speed increasing mechanism 25 that increases the speed of rotation of the spool 10 at a predetermined speed-doubling rate to rotate the magnets 21 is disposed between the rotation sensor 15 and the rotating shaft 10a of the spool 10. Thus, since the amount of rotation of the magnets 21 is larger than that of the spool 10, the circumferential length of each of the N-pole magnets 21a and S-pole magnets 21b can be set to be long. In other words, a reference angle to be detected by the rotation sensor 15 can be made larger than a reference angle to be detected by the conventional rotation sensor. It is thus possible to effectively reduce variation in detection of the rotation sensor 15. Therefore, it is possible to more effectively improve detection accuracy of the rotation sensor 15.

In the seatbelt apparatus 1 according to the present invention, which includes the seatbelt retractor 3 of the first embodiment, it is possible to efficiently restrain an occupant with the seatbelt 4 for a long period of time depending on how the vehicle runs, how the seatbelt apparatus 1 is used, etc.

The other operational effects of the seatbelt retractor 3 and the operational effect of the seatbelt apparatus 1 according to the first embodiment are the same as those of the seatbelt retractor 3 and the seatbelt apparatus 1 described in PTL 1.

Figure 3:
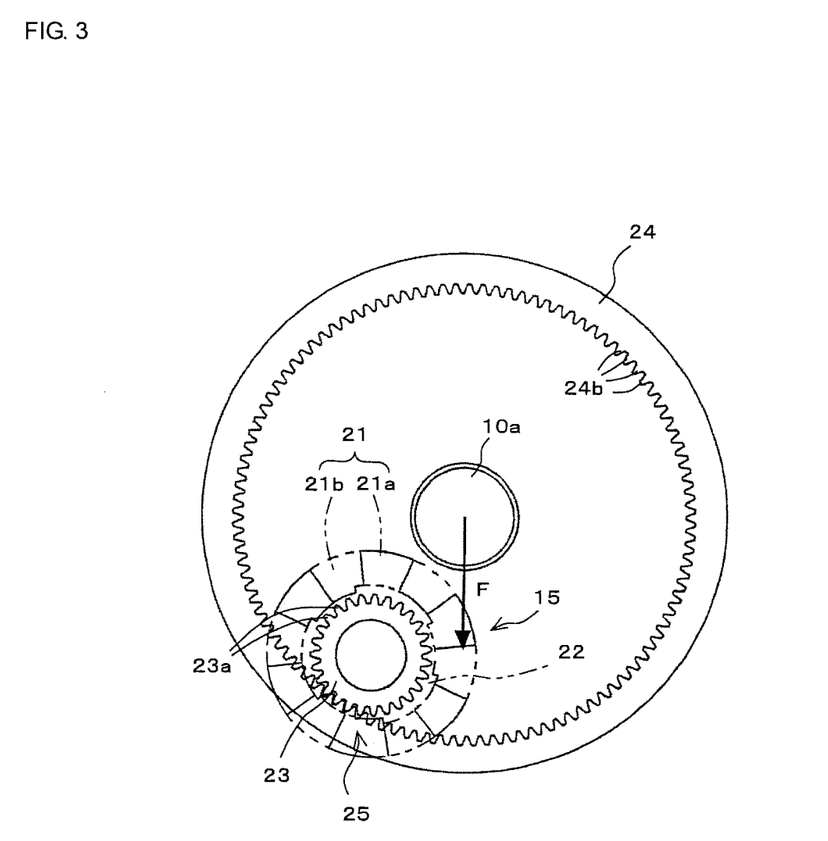
FIG. 3 illustrates a second embodiment of the present invention and corresponds to FIG. 2.

FIG. 3 illustrates a second embodiment of the present invention and corresponds to FIG. 2.

Figure 1:
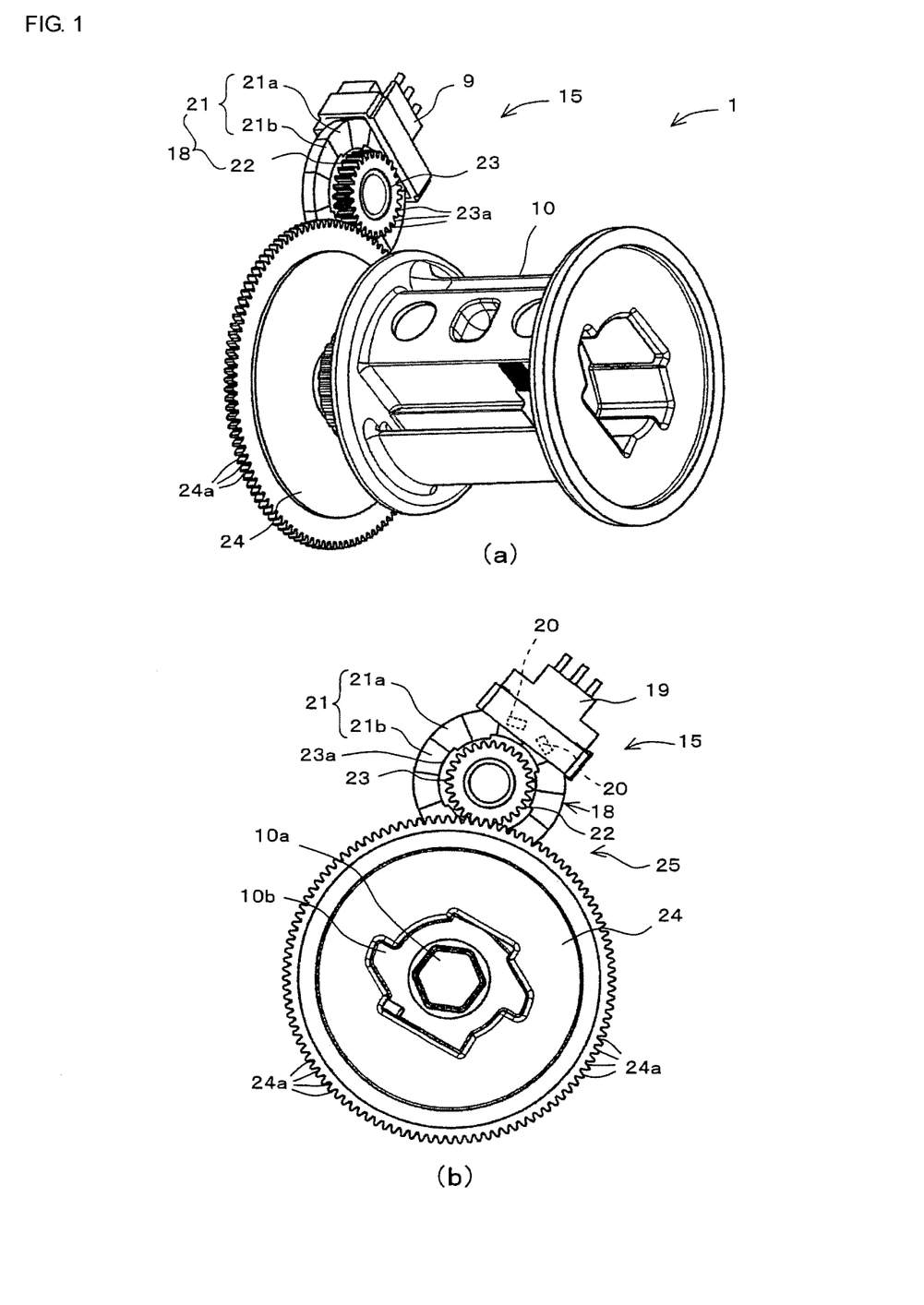
FIG. 1(a) is a perspective view partially illustrating a first embodiment of a seatbelt retractor according to the present invention.
FIG. 1(b) is a right side view of FIG. 1(a).

In the first embodiment illustrated in FIG. 1 and FIG. 2, the transmitting gear 24 has the external teeth 24a and the external teeth 23a of the receiving gear 23 of the rotation sensor 15 are configured to engage with the external teeth 24a of the transmitting gear 24. In the seatbelt retractor 3 of the second embodiment, as illustrated in FIG. 3, the transmitting gear 24 is an internal gear having internal teeth 24b. Then, the external teeth 23a of the receiving gear 23 engage with the internal teeth 24b of the transmitting gear 24. In this case, the external teeth 23a and the internal teeth 24b constitute the speed increasing mechanism 25. As in the first embodiment, the rotation sensor 15 is disposed eccentrically with respect to the rotating shaft 10a of the spool 10 in a radial direction of the rotating shaft 10a, and at a position in a direction in which the transmitting gear 24 is separated from the receiving gear 23 by a large load F applied to the spool 10 in an emergency.

The other configurations and operational effects of the seatbelt retractor 3 of the second embodiment are substantially the same as those of the first embodiment illustrated in FIG. 1 and FIG. 2.

Figure 4:
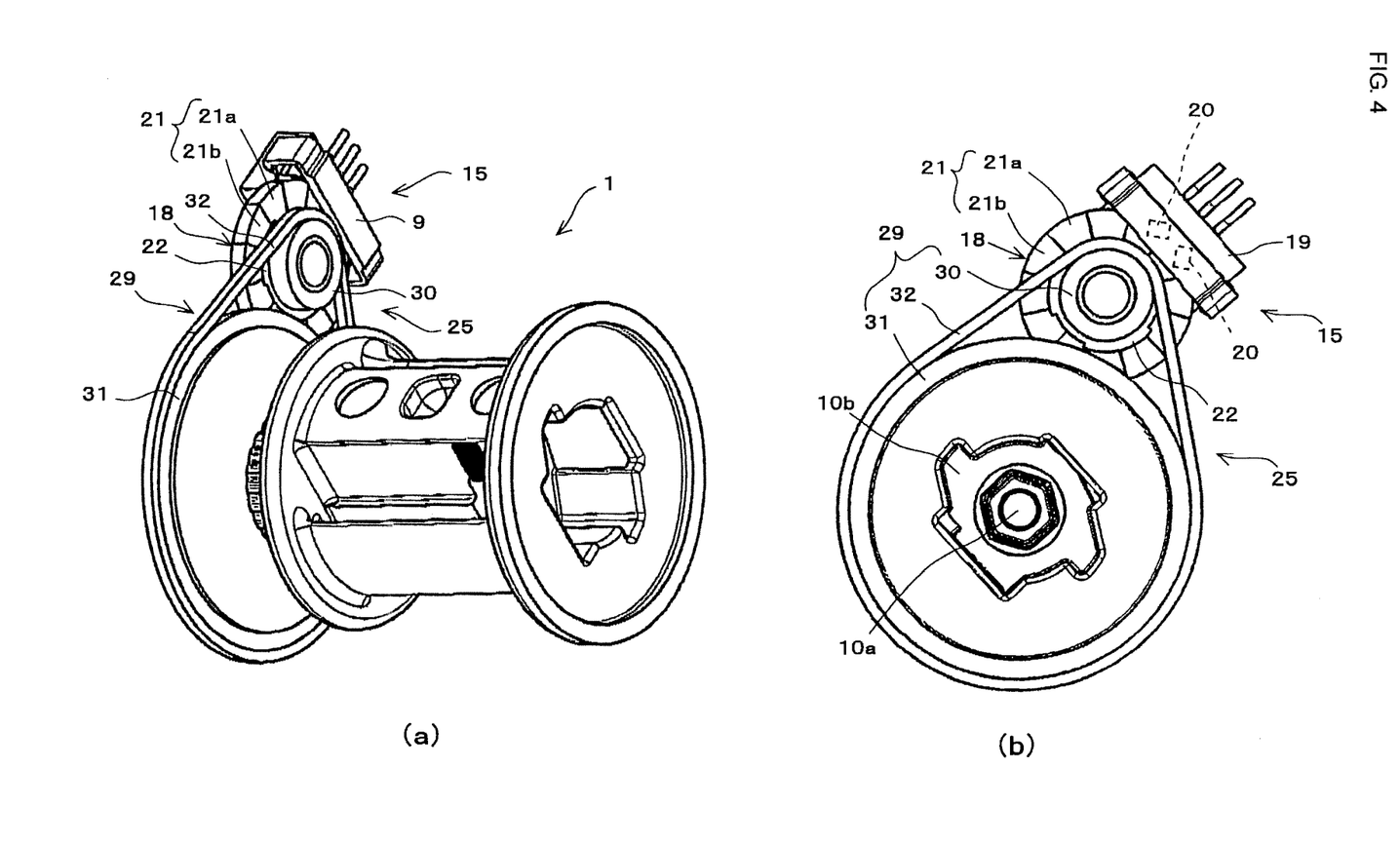
FIG. 4(a) and FIG. 4(b) illustrate a third embodiment of the present invention and correspond to FIG. 1(a) and FIG. 1(b), respectively.

FIG. 4(a) and FIG. 4(b) illustrate a third embodiment of the present invention and correspond to FIG. 1(a) and FIG. 1(b), respectively.

In the first and second embodiments described above, the speed increasing mechanism 25 is a gear mechanism composed of the receiving gear 23 of the rotation sensor 15 and the transmitting gear 24 secured to the rotating shaft 10a of the spool 10. In the seatbelt retractor 3 of the third embodiment, as illustrated in FIG. 4(a) and FIG. 4(b), the speed increasing mechanism 25 is constituted by a belt transmission mechanism 29. Specifically, in the third embodiment, instead of the receiving gear 23 of the first embodiment, a receiving pulley 30 is mounted on the magnet holding member 22 of the rotation sensor 15 in the same manner as the receiving gear 23. Also, instead of the transmitting gear 24 of the first embodiment, a transmitting pulley 31 is mounted on the rotating shaft 10a of the spool 10 in the same manner as the transmitting gear 24. Additionally, an endless belt 32 is wound around the receiving pulley 30 and the transmitting pulley 31. That is, the belt transmission mechanism 29 is composed of the receiving pulley 30, the transmitting pulley 31, and the endless belt 32. An endless-belt-winding radius of the transmitting pulley 31 is set to be larger than that of the receiving pulley 30. Thus, the rotation of the spool 10 is speeded up and transmitted to the magnets 21, so that the rotation speed of the magnets 21 is larger than that of the spool 10.

The other configurations and operational effects of the seatbelt retractor 3 and the seatbelt apparatus 1 of the third embodiment are substantially the same as those of the first embodiment.

The present invention is not limited to the embodiments described above, and various design changes can be made within the scope of technical matters described in the claims.

Industrial Applicability

The seatbelt retractor and the seatbelt apparatus according to the present invention may be used as a seatbelt retractor and a seatbelt apparatus including the same in which an electric motor drives and controls rotation of a spool to retract and withdraw a seatbelt. In particular, the seatbelt retractor and the seatbelt apparatus according to the present invention may be suitably used as a seatbelt retractor and a seatbelt apparatus including the same that include a rotation detecting member configured to detect the amount of rotation of a spool.

The invention claimed is:

1. A seatbelt retractor comprising:
   at least a spool configured to retract a seatbelt;
   drive means for rotating the spool; and
   a rotation detecting member configured to detect the amount of rotation of the spool, the amount of rotation of the spool being controlled by driving and controlling the drive means on the basis of the amount of rotation of the spool detected by the rotation detecting member,
   wherein the rotation detecting member is disposed eccentrically with respect to a rotating shaft of the spool in a radial direction of the rotating shaft, and
   wherein the rotation detecting member is disposed in a direction in which the rotating shaft is separated from the rotation detecting member by a load applied from the seatbelt to the spool in an emergency.

2. The seatbelt retractor according to claim 1, wherein the rotation detecting member includes a rotating disk that includes a predetermined number of magnets and a receiving member rotatable integrally with the predetermined number of magnets, the predetermined number of magnets including N-pole magnets and S-pole magnets alternately and annularly arranged concentrically with the rotating disk,
   the seatbelt retractor further comprising a transmitting member configured to transmit rotation of the spool to the receiving member, the transmitting member being mounted on the spool so as to be rotatable integrally with the spool; and
   a magnet detecting member configured to detect a magnet located at a predetermined position, the magnet being any of the predetermined number of magnets.

3. The seatbelt retractor according to claim 2, further comprising a speed increasing mechanism configured to increase a rotation speed of the transmitting member to transmit the rotation speed to the receiving member, and increase a rotation speed of the spool to rotate the magnets.

4. The seatbelt retractor according to claim 3, wherein the receiving member is a receiving gear and the transmitting member is a transmitting gear that engages with the receiving gear; and
   the speed increasing mechanism is composed of the receiving gear and the transmitting gear.

5. The seatbelt retractor according to claim 3, wherein the receiving member is a receiving pulley and the transmitting member is a transmitting pulley; and
   the speed increasing mechanism is composed of the receiving pulley, the transmitting pulley, and an endless belt wound around the receiving pulley and the transmitting pulley.

6. A seatbelt apparatus comprising:
   at least a seatbelt retractor configured to retract a seatbelt;
   a tongue slidably supported by the seatbelt withdrawn from the seatbelt retractor; and
   a buckle with which the tongue is engageably and disengageably engaged, the seatbelt apparatus being configured to restrain an occupant with the seatbelt,
   wherein the seatbelt retractor is a seatbelt retractor according to claim 1.

* * * * *